June 4, 1946.　　J. MIHALYI ET AL　　2,401,708
RANGE FINDER
Filed Jan. 19, 1943　　4 Sheets-Sheet 1
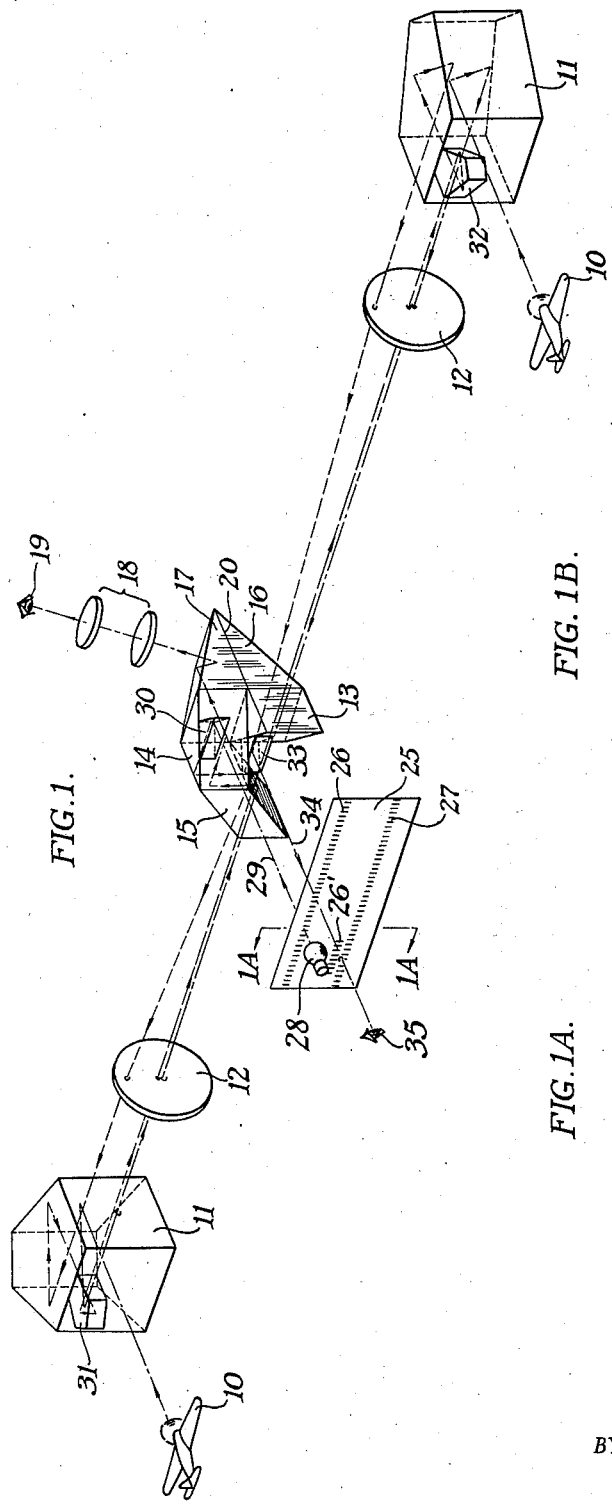
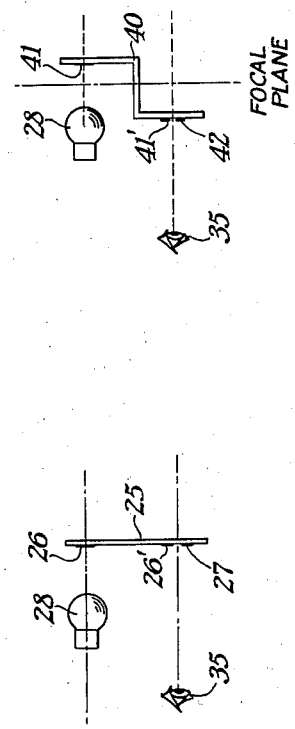
JOSEPH MIHALYI
STEPHEN M. MACNEILLE
INVENTORS
ATT'Y & AG'T June 4, 1946.　　　J. MIHALYI ET AL　　　2,401,708
RANGE FINDER
Filed Jan. 19, 1943　　　4 Sheets-Sheet 2
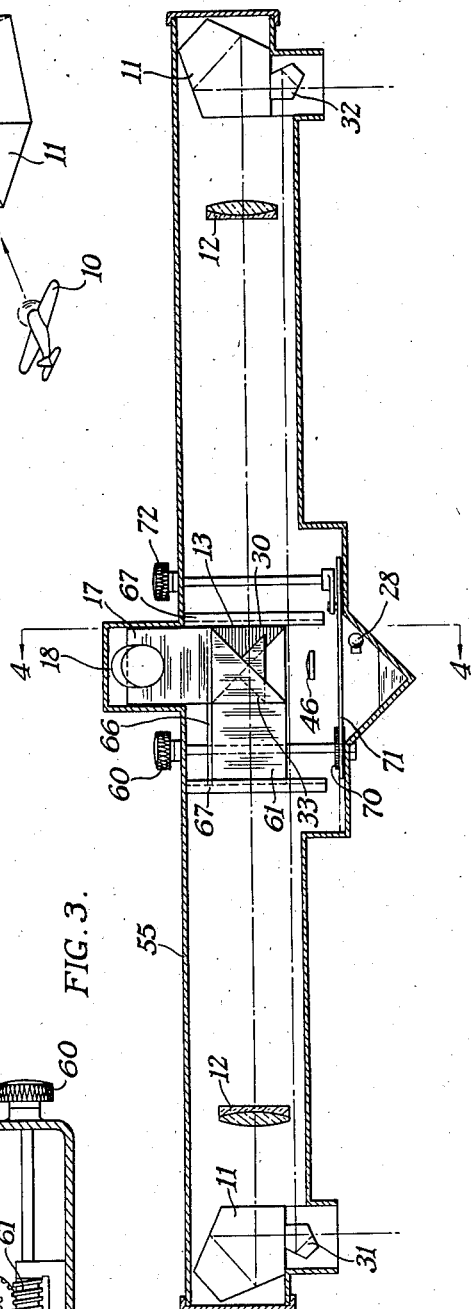
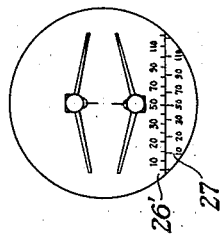
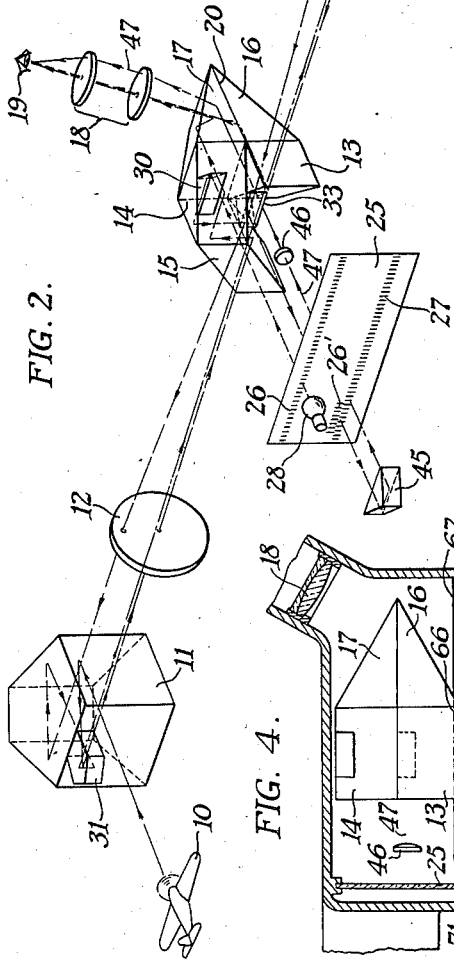
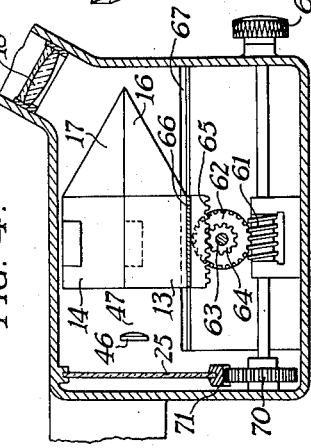
JOSEPH MIHALYI
STEPHEN M. MacNEILLE
INVENTORS
BY
ATT'Y & AG'T

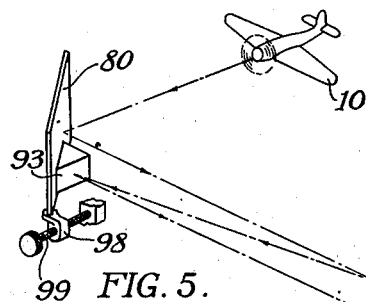
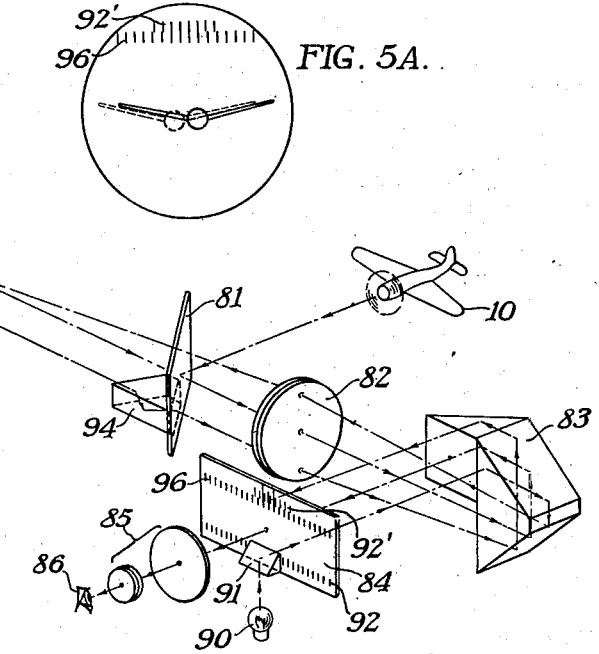
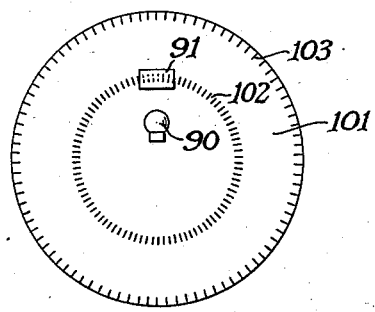
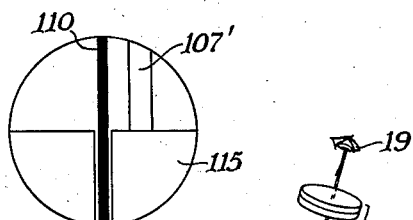
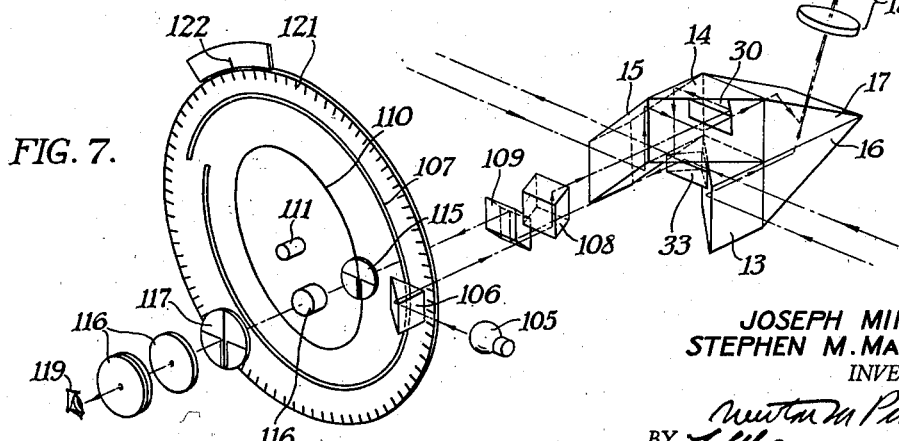

June 4, 1946.   J. MIHALYI ET AL   2,401,708
RANGE FINDER
Filed Jan. 19, 1943   4 Sheets-Sheet 4

JOSEPH MIHALYI
STEPHEN M. MacNEILLE
INVENTORS

ATT'Y & AG'T

Patented June 4, 1946

2,401,708

UNITED STATES PATENT OFFICE 2,401,708

RANGE FINDER

Joseph Mihalyi and Stephen M. MacNeille, Rochester, N. Y., assignors to Eastman Kodak Company, Rochester, N. Y., a corporation of New Jersey Application January 19, 1943, Serial No. 472,834

25 Claims. (Cl. 88—2.7)

This invention relates to range finders.

This is Case D of a series of applications relating to this same subject and including:

| Title | Serial No. | Filed | Inventors |
|---|---|---|---|
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Polarizing beam splitter. | 481,391 | Apr. 1, 1943 | MacNeille. |
| Range finders—Case M | 491,954 | June 23, 1943 | Do. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |

Cases A, B and C had in general similar objects and advantages obtained respectively in different types of range finders which objects were mainly to compensate for any errors due to maladjustment of optical parts of the instrument. The present Case D relates to refinements and embodiments of the broad invention described in the first three cases. The present case has for its objects, increased accuracy of reading, greater simplicity and its accompanying increased dependability and in one species of the invention, the simplification in the method of incorporating the broad invention in symmetrical range finders.

All of these objects can be obtained simultaneously by an arrangement incorporating several valuable features whose independent values are enhanced by the presence of other features. On the other hand, each of the features as subcombinations, are separately useful and reference to the other cases of this series will give further indication of how the various features are useful independently as well as in combination.

One feature according to the invention is to use adjustment coincidant elements which consist of a scale and a vernier index for the scale. As described in the first three cases of the series and in more detail below, an image of one of the adjustment coincidant elements is projected adjacent to the other element or an image thereof. The optical system for projecting this image has, of course, a corresponding "field." In the present case both elements should, or at least may, extend beyond this optical field. In use, the elements are moved across the field until the part of the scale and vernier which match are somewhere in the field. This feature provides greatly improved accuracy of reading because it permits the scale to be greatly expanded. It is noted that the distance, which in a simple scale and index system is the whole range of movement of the index, becomes in the present invention just the differential between the vernier and the scale, and hence, the latter may be of any convenient length.

Another feature closely related to this first one, but not necessarily requiring a vernier, is the provision of an arrangement in which the scale is the element whose image is projected adjacent to the index rather than vice versa as preferred in Case A of the series. When the scale is the movable element it is possible to have a greatly enlarged scale.

A third feature according to the invention is to have both adjustment coindicant elements, whatever their form, carried on a movable member made of glass or other transparent material. Case A has one embodiment in which both elements are on a single member, but in that embodiment the member may be fixed, and if fixed, does not permit many of the various forms of expanded scale, such as the above-mentioned scale and vernier system or a coincidence line and fiducial mark system. The movable feature is thus a preferred form of the idea of having both elements on a single member. This third feature eliminates any source of error due to relative movement of the elements which is, of course, quite desirable when using either a vernier index or a coincidence line. The unit carrying both adjustment coindicant elements may be in the comparison field of the range finder or to one side of the range finder system.

A fourth feature of the present invention provides a convenient arrangement for having the elements to one side of the optical system of a symmetrical type range finder. This latter feature is useful with various forms of the elements, but it is particularly practical when one or more of the other features mentioned are combined with it to eliminate certain sources of error which could seriously hamper the use of the fourth feature. In symmetrical type range finders there are usually crossed mirrors or prisms centrally located between the viewing points of the range finder; these crossed reflectors direct the optical beams into alignment toward a comparison field. According to the present invention, the adjustment coindicant elements are located to the side of the crossed reflectors opposite to the comparison field. The element light beam by which the image of one element is formed adjacent to the other is reflected from the backs of the crossed reflectors or by prisms cemented to these backs. When the object images are formed in the comparison plane by two objectives one between each viewing point or window of the range finder and the crossed reflectors, the adjustment coincidant elements should be substantially at the focal plane of the objectives, i. e. at a plane which is the optical equivalent of the comparison plane. On the other hand, if only a single objective is used, for example, between the crossed reflectors and the comparison field, an auxiliary objective has to be used in the element beam first to collimate the light from one element and later to refocus it adjacent to the other element. This latter species permits some latitude in the power of the auxiliary lens, and hence, in the position and magnification of the scale and index.

When this fourth feature of the invention is employed the range may be read by an auxiliary observer or extra reflectors and lenses may be included for reimaging the scale and index reading into the field of view of the primary observer.

Other objects and advantages of the present invention will be apparent from the following description when read in connection with the accompanying drawings in which:

Fig. 1 is a perspective view of the optical system of an embodiment of the invention incorporating all of the above features. Fig. 1A is a side elevation of one detail of Fig. 1 and Fig. 1B is an alternative arrangement of this detail.

Fig. 2 similarly illustrates an embodiment of the invention which differs from that shown in Fig. 1 by the inclusion of means for permitting a scale to be read by the primary observer. Fig. 2A shows the field of view of the observer.

Fig. 3 is a plan view partly in section of the range finder incorporating the optical system shown in Fig. 2.

Fig. 4 is a cross section in elevation of the embodiment shown in Fig. 3.

Fig. 5 is a perspective view of another embodiment of the invention, Fig. 5A being a view through the eyepiece of this embodiment.

Fig. 6 shows an alternative form of one of the details in Fig. 5.

Fig. 7 shows an alternative form of one of the details of Fig. 1, Fig. 7A being a view through the eyepiece of the auxiliary observer in this embodiment.

Figure 8:
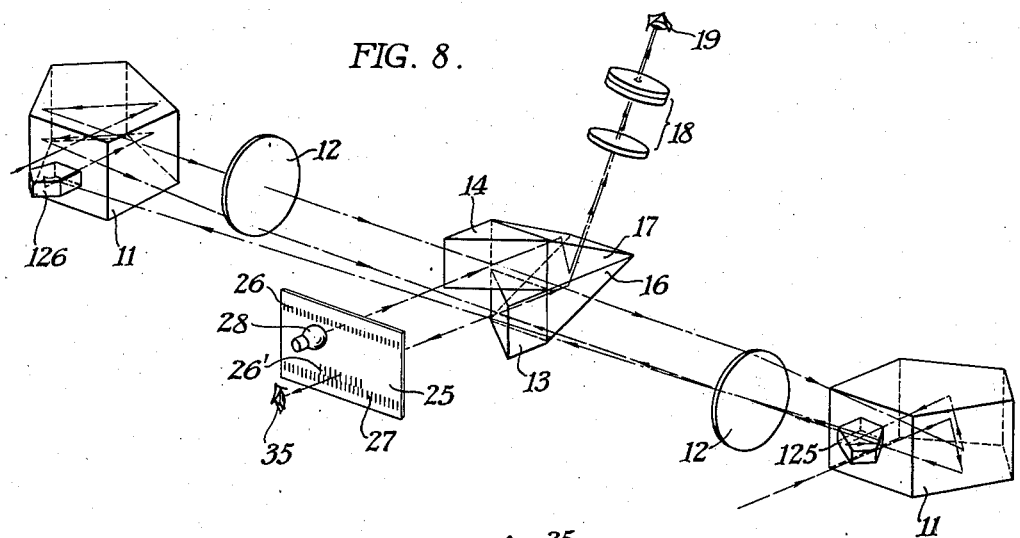
Fig. 8 shows a simplied form of the embodiment shown in Fig 1.

In Fig. 1 light from a distant object, represented by two small aeroplanes 10 immediately in front of the viewing points of the range finder, is reflected by pentaprisms 11 through objectives 12 to crossed mirrors or prisms 13 and 14, an auxiliary rhomb 15 being cemented to the prism 14 to align the beams properly, which prisms 13 and 14 direct these object beams into alignment. These beams then pass into right angle prisms 16 and 17 whose interface 20 is partly reflecting and partly transmitting so that the two beams pass upward through the hypotenuse face of the prism 17, after being respectively reflected and transmitted at the surface 20, through an eyepiece 18 to the eye 19 of an observer. According to the present invention, light from a lamp 28 passes through a scale 26 carried on a flat movable member 25 and as shown by the ray 29 is reflected into the prism 14 by an auxiliary prism 30 cemented thereto. This element beam passes through the rhomb 15 and is collimated by the objective 12 after which it is reflected by the penta prism 11 and a small penta prism 31 cemented to the front thereof to another small penta prism 32 and thence back into the range finder optical system to be brought to focus by the other objective 12 forming an image 26' adjacent to a vernier index 27 carried by the member 25. As indicated by the ray 34 this element beam after entering the prism 13 is reflected by an auxiliary prism 33 cemented thereto. An auxiliary observer whose eye is shown at 35 can read the range by comparing the vernier 27 with the scale 26', moving the member 25 if necessary to bring the matching parts of the scale and vernier into the field being projected, and hence, into the field of view of the eye 35. An elevation of the element 25 is shown in Fig. 1A. Since the main requirement is to have the image of the scale 26 fall adjacent to the vernier index 27, it is not absolutely necessary to have the member 25 perfectly flat, but as shown in Fig. 1B, an offset member 40 may be used in place thereof so long as the plane of the scale 41 and index 42 are conjugate with respect to the optical system so that the image 41' falls adjacent to the scale 42. However, for various reasons this is a less preferable form of the invention.

Fig. 2 differs from Fig. 1 by the inclusion of a Porro prism 45 for reflecting light from the scale image 26' and index 27, as indicated by the ray 47 through a relay objective 46 into focus adjacent to the comparison field of the range finder as shown in Fig 2A. It will be noted that the auxiliary prism 33 which is cemented to the prism 13 serves not only to reflect the element beam to form the image 26' but also to permit the reentering of this beam as indicated by the ray 47 into the range finder system.

As shown in Fig. 3 coincidence is obtained with this range finder by moving the crossed reflectors 13 and 14 transversely with respect to the main axis of the range finder. This movement is provided by having the crossed reflectors carried as a unit on a support 66 moving on tracks 67 as shown in Figs. 3 and 4. This movement is provided by a rack 65 moved by a pinion 64 carried on a shaft 63 which is rotated by a worm gear 62 driven by a worm 61 which may be operated by a ranging knob 60.

According to a preferred embodiment of the invention, this knob 60 also rotates a pinion 70 which operates a rack 71 carrying the movable member 25, so that the matching parts of the scale and index 26 and 27 are somewhere in the field of the optical system which projects the element beam and the field of the optical system for viewing the scale and index. This latter adjustment is not critical since it is only necessary to insure that the matching points are somewhere in the field of view. The prism 45 is conveniently mounted together with the lamp 28 in an alcove provided in the housing 55 of the range finder. A switch operated by button 72 is provided for turning the lamp 28 on when the observer wishes to take a reading.

In Fig. 5 certain features of the invention are shown applied to a simplified form of range finder in which only a single objective is used. Light from the distant object, again represented by the small aeroplanes 10, is reflected by a mirror 80 and a semi-transparent mirror 81 through a single objective 82 and an erecting prism 83 into focus forming comparison images on the surface of a movable member 84 positioned in the field of an eyepiece 85 to be observed by the eye 86 of an observer. Light from a lamp 90 is reflected by a prism 91 through a scale 92 carried by the movable member 84 and thence through the erecting prism 83 and the objective 82 to be reflected by the surface 93 of a prism cemented to the mirror 80. After reflection this element beam is further reflected by a dove prism 94 cemented to the semi-transparent mirror 81 back through the objective 82 and erecting prism 83 forming an image 92' adjacent to an index 96 to be viewed by the observed as best shown in Fig. 5A. The object images are brought into coincidence for ranging by a nut 98 and driving screw 99 rotating the mirror 80. This is similar to the device shown in Case B of this series. According to the present invention the scale 92 is the element projected and it is carried by a movable member 84 which also carries the index and furthermore this index is a vernier 96 for the scale 92.

In Fig. 6 the movable member 84 is replaced by a rotatable disc member 101 carrying a scale 102 and a vernier 103 with it. The operation is, of course, the same as in Fig. 5 except that the movable member is rotated instead of being moved transversely.

In Fig. 7 the scale and index system of Fig. 1 is replaced by a coincidence line and fiducial mark arrangement. Light from a lamp 105 is reflected by a prism 106 to illuminate a transparent coincidence line 107 which is in the form of a spiral mounted on a disk to rotate about an axle 111. The light passing through the coincidence line 107 is reflected by a rhomb 108 into the prism 30 and thence through the optical system of the range finder and from one viewing point to the other and back to the prism 33 which in turn reflects it through another rhomb 109 and into focus forming an image 107' in the plane of the disk. This disk also carries a concentric circle 110 which acts as a fiducial mark against which the image 107' is to be matched by rotating the disk to bring the proper part of the spiral 107 into the field. For convenience, a small disk 115 is placed adjacent to the circle 110 and has masked-off areas as shown. This disk is not absolutely necessary but with part of the image 107' masked off, it is much easier to observe coincidence of the image 107' and the mark 110. A relay lens 116 is provided for forming an image of this matching coincidence line and fiducial mark in the plane 117 of an eyepiece 118 to be observed by an auxiliary observer whose eye is shown at 119. When the primary observer whose eye is shown at 19 brings the object image into coincidence by any suitable light deviating device, the auxiliary observer whose eye is shown at 119 rotates the disk carrying the spiral 107 until the image 107' coincides with and evenly overlaps the fiducial mark 110. At this time the range may be read by a scale 121 and an index 122 operated by the disk. Since the spiral 107 and the circle 110 are carried on the same movable member, there is no relative movement of these two to introduce an error into this system.

Fig. 8 differs from Fig. 1 by the elimination of the prisms 30 and 33 and the rhomb 15. Instead of having the extra prisms, the light from the scale 26 is reflected by the back of the prism 14 which is silvered for this purpose through the objective 12 and penta prism 11 into a small penta prism 125 which is tipped just appreciably downward so that the light reflected therefrom passes down to another small penta prism 126 and thence back into the optical system of the range finder. This beam is focused by the other objective 12 and reflected from the back of the prism 13 to form the image 26' adjacent to the vernier index 27.

Figure 9:
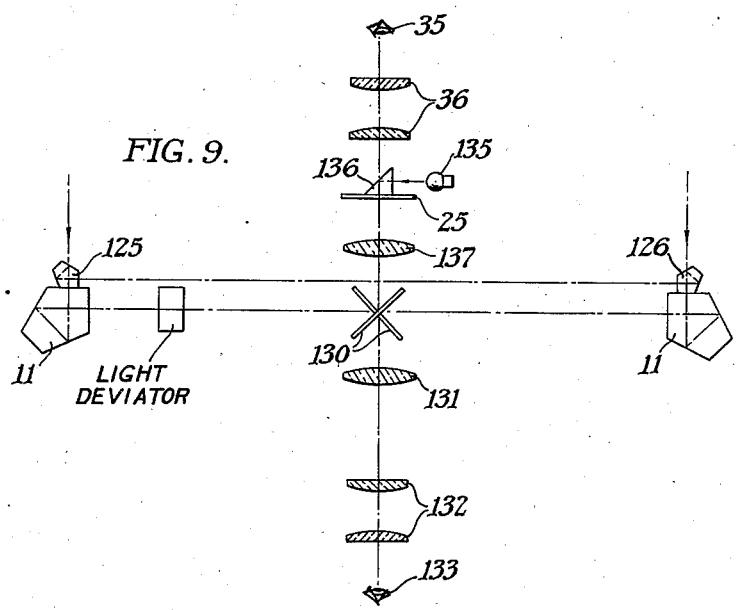
Fig. 9 is a plan view of another embodiment of the invention.

In Fig. 9 the object beams remain collimated until after passing through the light deviator and being reflected from the crossed mirrors 130 toward a single objective 131. This objective focuses both beams in the field of view of an eyepiece 132 to be viewed by the eye 133 of an observer. On the other side of the reflectors 130, light from a lamp 135 is reflected from a prism 136 past a range indicating element carried on the member 25. This light is collimated by an auxiliary objective 137 and reflected from the backs of the reflectors 130 in the same way as in Fig. 8 and is then brought to focus again by the objective 137 to form an element image on the member 25 to be viewed adjacent to the other element by an eye 35 and eyepiece 36. Although this simplified form of the invention has certain disadvantages, it has certain advantages. For example, any movement of the single objective 131 affects both object beams equally, and hence, the autocollimating introduced by having the adjustment coincidant elements projected through the range finder optical system is provided without reference to the objective 131. Similarly, since the correction is all accomplished in the collimated part of the element beam and since any movement of the objective 137 equally affects the outgoing and returning parts of the element beam, there is considerable freedom of choice regarding the power of this objective 137.

Having thus described various embodiments of our invention, we wish to point out that it is not limited to these structures but is of the scope of the appended claims.

What we claim and desire to secure by Letters Patent of the United States is:

1. A range finder of the type having scale and index adjustment coincidant elements and an internal collimating system including means for projecting through at least part of the optical system of the finder, light from one element into focus forming an image adjacent to at least an image of the other element, said range finder being characterized by a movable member carrying both the index and the scale inmovable relative to one another, by the scale being elongated beyond the field of said projecting means, by the index being a vernier for the scale and by said member being movable in a direction to bring into said field the scale point aligned with the vernier as shown by said element image and said other element.

2. A range finder according to claim 1 in which said scale and vernier index are straight and parallel on the movable member.

3. A range finder according to claim 1 in which said scale and vernier index are curved and concentric on the movable member.

4. In a coincidence range finder of the type having adjustment coincidant elements and an internal collimating system including means for projecting through at least part of the optical system of the finder, light from one element into focus forming an image adjacent to at least an image of the other element, the combination of a flat transparent member optically to one side of the finder optical system movable in its own plane independent of the finder optical system and carrying both of said elements and reflector means in said optical system for receiving light from said one element, for reflecting it through said at least part of the optical system, for receiving it after traversal of said at least part and for reflecting it toward at least an image of the other element.

5. The combination according to claim 4 in which said reflector means is positioned to form in the comparison field of the finder, virtual images of the elements.

6. The combination according to claim 4 including means for moving the transparent member to bring into the field of said projecting means, the part of said other element which matches said element image.

7. The combination according to claim 4 in which said elements are a scale and an index for the scale.

8. The combination according to claim 4 in which said elements are a scale and a vernier index for the scale.

9. The combination according to claim 4 in which said elements are a scale and a vernier index for the scale, and in which means are included for moving the transparent member to bring into the field of said projecting means, the part of the vernier which matches the scale.

10. A range finder of the type having an eyepiece focused on a comparison plane symmetrically located between two view points and crossed reflecting surfaces for directing light from the two viewpoints to said plane, said range finder being characterized by adjustment coincidant elements rigidly attached to one another and spaced from the reflecting surfaces on the side opposite to the comparison plane, an auxiliary reflecting surface rigidly attached to each of the crossed surfaces and means, including both auxiliary reflecting surfaces, at least the equivalent of all of the optical system of the finder between the surfaces and the viewpoints and reflectors for reflecting light from one viewpoint to the other, for projecting adjacent to one of the elements an image of the other element.

11. A range finder according to claim 10 in which the crossed surfaces are one above the other.

12. A range finder according to claim 10 in which the crossed surfaces are the hypotenuse faces of 45° right-angle prisms one above the other.

13. A range finder according to claim 10 of the type having an objective between each viewpoint and the crossed reflecting surfaces and in which the optical distance from the elements to the crossed surfaces via the auxiliary surfaces is optically equivalent to the distance from the comparison plane to the crossed surfaces.

14. A range finder according to claim 10 in which the auxiliary reflecting surface in each case consists of one side face of a 45° right-angle prisms whose other side face is cemented to the corresponding crossed surface and whose hypotenuse face faces the elements.

15. A range finder according to claim 10 in which the crossed surfaces are the hypotenuse faces of 45° right-angle prisms one above the other and each auxiliary reflecting surface is one side face of another 45° right-angle prism whose other side face is cemented to the corresponding crossed surface and whose hypotenuse face faces the elements.

16. A range finder according to claim 10 in which the auxiliary surface is the back of the corresponding crossed surface.

17. A range finder according to claim 10 in which both elements are carried by a flat transparent member.

18. A range finder according to claim 10 in which said elements are a scale and an index for the scale.

19. A range finder according to claim 10 in which said elements extend beyond the field of said projecting means and are carried by a movable member for bringing into the latter field the matching points of the elements.

20. A range finder according to claim 10 in which said elements are a scale and a vernier index for the scale, both extending beyond the field of said projecting means and are carried by a movable member for bringing into the latter field the matching points of the elements.

21. In a coincidence range finder of the type having adjustment coincidant elements and an internal collimating system including means for projecting through at least part of the optical system of the finder, light from part of one element into focus forming an image adjacent to at least an image of part of the other element, the combination of a flat member carrying both of said elements and means for moving the flat member in its own plane independent of the finder optical system to bring into the field of said projecting means, the part of said other element which matches said one element image.

22. The combination according to claim 21 in which said elements are a scale and a vernier for said scale.

23. The combination according to claim 21 in which said movable member is to one side of the range finder system.

24. A range finder of the type having adjustment coincidant elements and an internal collimating system including means for projecting through at least part of the optical system of the finder, light from one element into focus forming an image adjacent to at least an image of the other element, said range finder being characterized by a scale and index incorporated as at least part of said adjustment coincidant elements, and means for projecting through at least the exact optical equivalent of both of said portions, light from at least part of the scale into focus forming an image thereof adjacent to the index, said ranging adjuster also adjusting said scale image relative to the index.

25. A range finder accordng to claim 24 including means coupled to the ranging adjuster for moving the scale longitudinally of itself to bring into the field of said projecting means the portion of the scale giving the range.

JOSEPH MIHALYI.
STEPHEN M. MacNEILLE.